May 5, 1964 R. E. BUCK 3,131,948
RETRACTABLE CHUCK JAW
Filed March 26, 1962 2 Sheets-Sheet 1

INVENTOR.
RUSSELL E. BUCK
BY Woodhams, Blanchard and Flynn
ATTORNEYS

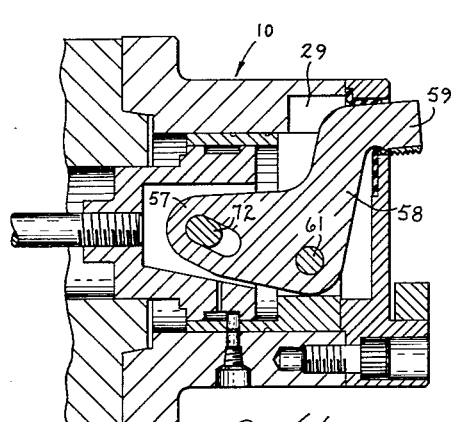

United States Patent Office 3,131,948
Patented May 5, 1964

3,131,948
RETRACTABLE CHUCK JAW
Russell E. Buck, Scotts, Mich., assignor to Buck Tool Company, Kalamazoo, Mich., a corporation of Michigan
Filed Mar. 26, 1962, Ser. No. 182,603
7 Claims. (Cl. 279—106)

This invention relates to a chuck construction and, more particularly, relates to a chuck having a pair of jaws, one of which is mounted for lateral movement toward and away from the other jaw and also for axial movement with respect thereto.

Chucks for holding workpieces usually employ radially movable jaws. Workpieces are loaded thereinto or unloaded therefrom by moving the workpieces axially with respect to the chuck body into or out of a position between the chuck jaws. However, there are situations where it is impossible or at least highly inconvenient to load and unload the workpieces by moving same axially with respect to the chuck body. For example, in certain types of operations, an elongated workpiece is held at both axial ends by axially non-movable chucks. Consequently, the workpiece must be loaded and unloaded by moving same transverse to the common axis of the chucks. Prior chucks have not been well adapted for use in such situations.

Accordingly, it is an object of this invention to provide an improved chuck construction in which workpieces can be loaded into or unloaded from the chuck by moving same transverse to the axis of the chuck.

It is a further object of this invention to provide an improved chuck construction, as aforesaid, in which the workpiece is held between two opposed jaws, one of which can be moved laterally toward and away from, and also axially with respect to, the other jaw.

It is a further object of this invention to provide an improved chuck construction, as aforesaid, in which the movable jaw can be moved axially between a position in which it is at least partially received within the chuck body and a postion wherein it projects axially beyond one end thereof and is opposed to the other chuck jaw.

It is a further object of this invention to provide an improved chuck construction, as aforesaid, which is relatively inexpensive to manufacture, which is simple to operate, which will have a long useful life and which will effectively hold the workpieces in the desired position.

Other objects and advantages of this invention will become apparent to persons acquainted with equipment of this type upon reading the following description and inspecting the accompanying drawings.

In the drawings:

FIGURE 4a is a sectional view, on an enlarged scale, taken along the line IV—IV of FIGURE 3 and showing the movable jaw in a fully retracted position.

FIGURE 4b is a view, on a reduced scale, similar to FIGURE 4a and showing the parts in an intermediate position.

FIGURE 4c is a view, on a reduced scale, similar to FIGURE 4a and showing the parts in another position wherein the movable jaw is gripping the work.

General Description

In general, the invention provides a chuck having a first chuck jaw stationarily mounted thereon and projecting axially from one face thereof. A second chuck jaw is mounted on the chuck for movement laterally with respect to the first chuck jaw so that workpieces can be releasably gripped therebetween. The second chuck jaw is also mounted for axial movement with respect to the first chuck jaw and is at least partly receivable within the chuck body so that it can be axially spaced from the first chuck whereby a workpiece can be loaded into or unloaded from the chuck by moving same laterally with respect to the first chuck jaw. Actuating means are provided for effecting lateral and axial movement of the second chuck jaw with respect to the first chuck jaw.

Detailed Description

Figure 1:
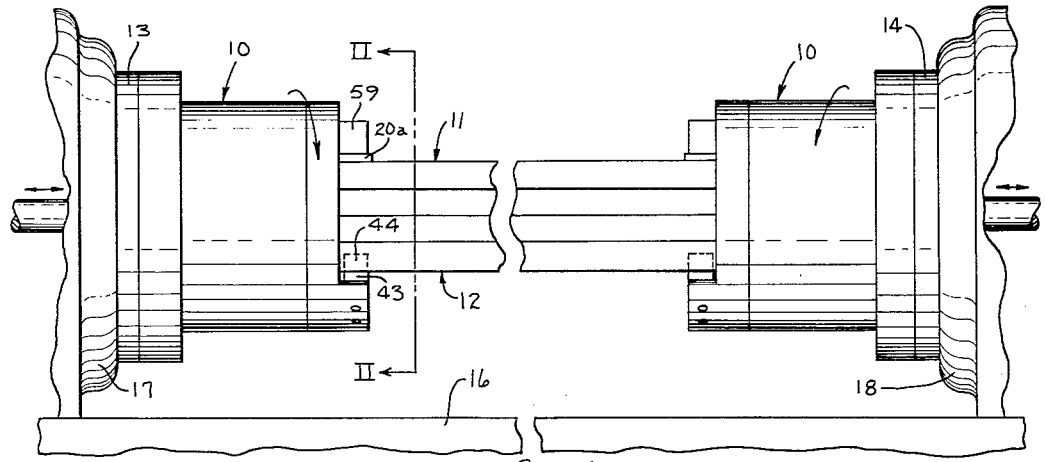
FIGURE 1 is a schematic view of an apparatus which includes the chuck construction to which the invention relates.

Referring to FIGURE 1, there is shown an apparatus with which the chuck constructed in accordance with the invention can be used advantageously. This apparatus includes a pair of chucks 10 which grip workpiece means, here a pair of molds 11 and 12, and support same. The chucks 10 are mounted on suitable plates 13 and 14 and said plates are in this embodiment supported for rotation, but not axial movement, with respect to a base 16 by and within conventional lathe castings 17 and 18. Since the lathe castings 17 and 18 and the plates 13 and 14 may be of any suitable, conventional type and since they form no part of the present invention, a detailed description thereof is believed unnecessary and these parts will not be described further.

Figure 2:
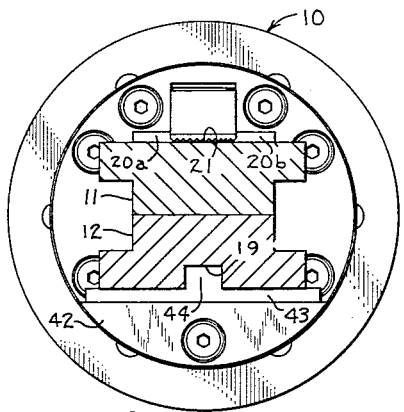
FIGURE 2 is a sectional view taken along the line II—II of FIGURE 1.
Figure 3:
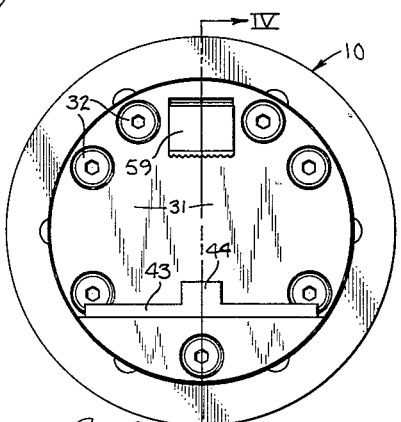
FIGURE 3 is a view similar to FIGURE 2 with the workpieces removed.

Referring to FIGURE 2, the mold 12 has a recess 19 in its outer face at each axial end thereof. A pair of spaced apart lugs 20a and 20b are secured to the outer face of mold 11 at each axial end thereof and define a recess 21. The chucks 10 are identical and each has two chuck jaws which are respectively receivable in the recesses 19 and 21 to hold the molds in their mating position as shown in FIGURE 2.

Each of the chucks 10 (FIGURE 4a) is comprised of an elongated, substantially cylindrical, chuck body 26 having a central opening 27. The chuck body 26 has a radially extending flange 28 at its rearward end whereby same may be secured to the fixture 13 by suitable and conventional means, such as bolts (not shown). An axially elongated recess 29 is provided in the chuck body 26 near the front end thereof and said recess communicates with the central opening 27 and also opens through the front end of said chuck body for purposes appearing hereinafter.

A jaw mounting member 30 is mounted on the front end of the chuck body 26 and is secured thereto by screws 32. The member 30 has a circular wall 31 which extends across and closes off the open front end of the chuck body 26. The wall 31 has a substantially radially extending groove 33 in its rearward surface which extends from below the center thereof to a point close to the periphery thereof. The wall 31 has an opening 34 therethrough which communicates with the outermost portion of the groove 33 and which is disposed in front of and constitutes an extension of the recess 29 in the chuck body 26. The jaw mounting member 30 has an axially projecting shoulder 42 on which is mounted the fixed chuck jaw, which in this embodiment is a bar 43 which engages the outer surface of the mold 12. The bar 43 has a centrally located, upwardly extending positioning block 44 which is receivable in the recess 19 in the mold 12 for preventing lateral movement thereof.

Figure 6:
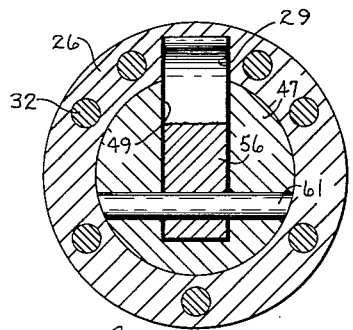
FIGURE 6 is a sectional view taken along the line VI—VI of FIGURE 4c.

A substantially cup-shaped jaw support 46 is axially slidably disposed within the central opening 27 of the chuck body 26. The support 46 has a relatively thick base wall 47 and a cylindrical side wall 48 which slidably engages the internal surface of the chuck body 26. A substantially diametrically extending slot 49 is provided through the base wall 47. The slot 49 is axially and radially aligned with the groove 33 (FIGURE 6).

A substantially L-shaped lever 56 extends through the slot 49. The lever 56 is comprised of a substantially axially extending first leg 57 and a substantially radially extending second leg 58. The first leg 57 extends rearwardly into the central opening 50 of the jaw support 46. The second leg 58 is angled forwardly and is receivable in the groove 33. The radially outermost portion of the second leg 58 is also receivable in the recess 29 of the chuck body as will be described hereinafter. A substantially axially extending nose 59 is provided on the radially outer end of the leg 58. If desired, a toothed insert 60 may be provided in the nose 59 for gripping the work. The nose 59 extends axially with respect to the chuck body through the opening 34 in the wall 31 and it is adapted to be disposed in confronting relationship with the bar 43. Thus, the nose 59 forms the second jaw of the chuck. The nose 59 is receivable within the recess 21 on the mold section 11 to prevent lateral movement thereof and, also to urge mold section 11 against mold section 12. Flexible sealing strips 62 and 63 are mounted on the member 30 and engage the upper and lower surfaces of nose 59 to prevent entry of dirt and other foreign matter into the interior of the chuck 10.

A pivot pin 61 is mounted in the base wall 47 and extends through the lever 56 substantially at the juncture of the first and second legs thereof and thereby supports said lever for pivotal movement about an axis which extends transverse to and which is located below the longitudinal axis of the chuck 10.

Figure 5:
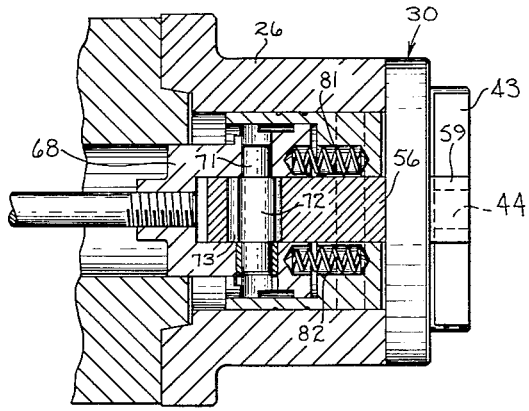
FIGURE 5 is a sectional view taken along the line V—V of FIGURE 4c.

An actuating means 66 is provided to effect pivotal and axial movement of the lever 56. The actuating means 66 includes a draw bar 67 which is movable longitudinally by suitable means, such as a rack and pinion drive or a piston and cylinder arrangement (not shown). A yoke 68 is connected to the forward end of the draw bar 67, such as by being threaded thereto as shown. The yoke 68 extends into the central opening 50 in the support 46 and is slidable therein. The yoke has a central opening 69 into which extends the rearward end portion of leg 57. A pin 71 (FIGURE 5) is mounted on the yoke 68 and extends across the opening 69 and it has an oval center section 72 which passes through an axially elongated slot 73 in the leg 57 of the lever 56. The slot 73 is inclined upwardly and rearwardly with respect to the longitudinal axis of the chuck. Thus, forward movement of the actuating means 66 and thereby the pin 71 will pivot the lever 56 clockwise and rearward movement thereof will pivot the lever counterclockwise. The yoke 68 has a shoulder 74 which is engageable with the fixture 13 to limit rearward movement of the actuating means 66.

The yoke 68 has a circumferential groove 76 in its periphery. The groove 76 communicates with a radial opening 75 which extends to the opening 69. A plurality of circumferentially spaced, hollow cylindrical pins, one of which appears at 77, are mounted in the side wall 48 and extend in the groove 76. Lubricant supply fittings, one of which is shown at 78, are mounted in the chuck body 26 and are alignable alternately with the pins 77 and the circumferential groove 79 in the sidewall 48 whereby lubricant can be supplied to the parts in the interior of the chuck body 26. The pins 77 also serve to effect simultaneous rearward (leftward) movement of the support 46 with the yoke 68 after said pins abut against the rightward axial end wall of the groove 76.

Spring means, here a pair of coil springs 81 and 82 (FIGURE 5), are disposed between the base wall 47 and the yoke 68 to urge same apart. During the initial rightward movement of the actuating means from its full leftward (FIGURE 4a) position, the springs 81 and 82 will urge the actuating means 66 and the support 46 to move as a unit rightwardly. After the support 46 has abutted against the surface 35 of the jaw mounting member 30 so that further rightward movement thereof is blocked, continued rightward movement of the actuating means 66 will effect clockwise pivoting of the lever 56.

*Operation*

While the operation of the chuck 10 has been indicated somewhat above, the same will be summarized briefly to insure a full understanding of the invention.

When the parts are positioned as shown in FIGURE 4c, the workpiece, as the unit comprising the molds 11 and 12, is firmly gripped between and held against lateral movement of the bar 43, the block 44 and the nose 59. If desired or necessary, a continuous rightwardly directed pressure can be imposed on the actuating means 66 to insure a firm gripping of the molds.

When it is desired to release the gripping engagement of the work, the actuating means 66 is moved leftwardly. Such leftward movement of the actuating means, which is assisted by the springs 81 and 82, will effect a corresponding leftward movement of the yoke 68. Such leftward movement of the yoke 68 will then, due to the inclination of the slot 73 and the engagement of the pin 72 therewith, effect a counterclockwise pivoting of the lever 56. However, no axial movement of the support 46 will occur at this time because of the rightwardly directed force of the springs 81 and 82 thereon and the lost motion connection provided by groove 76 and pins 77.

When the parts have moved to the position shown in FIGURE 4b, the jaw support 46 will not have moved axially. However, the nose 59 will have been moved away from the bar 43 to release the work. If conditions permit, the workpiece can then be removed by moving same axially with respect to the chuck body. However, if such axial movement of the workpiece cannot take place, as is the case with the arrangement shown in FIGURE 1, it is then necessary to move the actuating means 66 further leftwardly from the position shown in FIGURE 4b to the position shown in FIGURE 4a. During such movement, the rightward end wall of the groove 76 engages the pins 77 and, thus, the actuating means 66 and the jaw support 46 move as a unit in a leftward direction. Such further leftward movement of the actuating means 66 does not effect any further pivoting of the lever 56 but, rather, effects only an axial movement of support 46 and thereby leftward movement of said lever. At the leftward end position of the actuating means 66, the radially outer end of the lever 56 and the nose 59 are received within the recess 29 in the chuck body 26 and the opening 34.

Movement of the nose 59 into gripping engagement with the work is effected by reversing the steps described above. It should be noted that in moving from the position of the parts shown in FIGURE 4a to the position thereof shown in FIGURE 4b the actuating means 66 and the jaw support 46 will move as a unit, due to the springs 81 and 82. After the jaw support 46 has abutted against the surface 35 of the jaw mounting member 30, then the actuating means 66 can move further rightwardly with respect to the support 46 to thereby effect clockwise pivoting of the lever 56.

While the foregoing description has indicated that the chuck is used to hold mold sections it will be apparent that the chuck construction can be utilized to handle a wide variety of workpieces of different shapes.

While a particular preferred embodiment of the invention has been described above, the invention contemplates such changes and modifications as therein lie within the scope of the appended claims.

What is claimed is:
1. A chuck comprising:
 a chuck body having a first chuck jaw stationarily mounted thereon and projecting axially from one face thereof;

means defining an axially extending recess in said chuck body on the opposite side of the axis thereof from said first chuck jaw, said recess extending through said one face of said chuck body;

actuating means mounted within said chuck body for axial movement therewithin with respect to the chuck body;

a second chuck jaw supported for pivotal movement with respect to said chuck body about an axis extending transverse to the longitudinal axis of said chuck body and also supported for axial movement with respect said chuck body, said second chuck jaw extending through said recess whereby said second chuck jaw may be disposed opposite said first chuck jaw to grip a workpiece therebetween; and means connecting said second chuck jaw to said actuating means so that axial movement of said actuating means effects pivotal and axial movement of said second chuck jaw with respect to said chuck body.

2. A chuck comprising:

a chuck body having a first chuck jaw projecting from one face thereof;

a second chuck jaw projecting axially from said one face of said chuck body and disposed in confronting relationship to said first chuck jaw whereby a workpiece can be gripped therebetween;

support means slidable axially within said chuck body and means on said support means for pivotally supporting said second chuck jaw for movement about an axis extending transverse to the longitudinal axis of said chuck body;

actuating means slidable axially within said chuck body and also slidable with respect to said support means for a limited distance;

means connecting said actuating means to said second jaw so that axial movement of said actuating means effects pivotal movement of said second chuck jaw; and lost motion means between said actuating means and said support means whereby after a predetermined axial movement of said actuating means further movement of said actuating means effects axial movement of said support means and said second chuck jaw with respect to said chuck body.

3. A chuck according to claim 2 in which said second jaw is integral with a substantially L-shaped lever and projects at substantially a right angle thereto;

said support means comprising a cup-shaped member coaxially slidably supported within said chuck body, said lever projecting through a slot in the base wall of said member and having a substantially axially extending first leg projecting into the zone defined by the side wall of said member, said lever having a substantially radially extending second leg;

a pivot pin mounted in said base wall and extending transversely through said lever substantially at the juncture of the first and second legs thereof;

said actuating means including a draw bar slidably supported within said member and carrying a pin which is received through an elongated slot in said first leg of said lever, said slot extending at an angle to the longitudinal axis of said chuck body; and abutment means carried by said member and engageable with said actuating means after a predetermined axial movement thereof in a direction away from said one face of said chuck body whereupon said member and said actuating means then move together away from said one face.

4. A chuck comprising:

a substantially cylindrical chuck body;

a first chuck jaw secured to one end of said chuck body on one side of the longitudinal axis thereof;

means defining an axially elongated recess in said chuck body substantially diametrically opposite said first chuck jaw;

a cup-shaped member slidably disposed within the central opening in said chuck body and having a base wall disposed adjacent said one end of said chuck body, said base wall having a slot including a radially extending section which communicates with said recess;

a substantially L-shaped lever having a first leg extending substantially axially within said member, the second leg of said lever extending through said slot;

a pivot pin mounted in said member and extending substantially transverse to the axis of said chuck body, said pivot pin extending through said lever substantially at the juncture of said first and second legs;

a second chuck jaw axially aligned with said recess, said second chuck jaw being integral with the radially outer end of said second leg of said lever and being opposed to said first chuck jaw;

an axially movable draw bar having a yoke slidably disposed within said member;

a pin carried by said yoke and extending through an elongated slot in said first leg of said lever, said slot extending at an angle to the longitudinal axis of said chuck body;

pin means carried by said member and slidably received within an axially elongated groove in said yoke;

spring means disposed between said yoke and said base wall for urging said member and said draw bar away from each other.

5. In a chuck construction, the combination comprising:

a chuck body having a central opening therein, said chuck body also having a jaw opening through one end thereof communicating with said central opening;

a jaw support slidably disposed within the central opening in said chuck body;

a substantially L-shaped lever having a first leg extending substantially axially within said jaw support, the second leg of said lever extending through said jaw opening and having a first chuck jaw thereon;

a second chuck jaw on said chuck body positioned with respect to said first chuck jaw so that a workpiece can be gripped therebetween;

pivot means mounted on said jaw support and extending substantially transverse to the longitudinal axis of said chuck body, said pivot means engaging and pivotally supporting said lever substantially at the juncture of said first and second legs;

An axially movable draw bar having a yoke slidably mounted on said jaw support;

a pin carried by said yoke and extending through an elongated slot in said first leg of said lever, said slot extending at an angle to the longitudinal axis of said chuck body whereby movement of said yoke with respect to said jaw support effects pivotal movement of said lever; and a lost motion connection between said jaw support and said yoke for permitting limited relative axial movement therebetween.

6. A chuck construction according to claim 5, in which said lost motion connection includes pin means carried by said jaw support and slidably received within an axially elongated groove in said yoke; and spring means disposed between said yoke and said jaw support for urging said jaw support and said draw bar away from each other.

7. In a chuck construction, the combination comprising:

a chuck body;

a first chuck jaw projecting axially from one face of said chuck body;

a second chuck jaw mounted on said chuck body and positioned with respect to said first chuck jaw so that a workpiece can be gripped therebetween;

support means slidable axially within said chuck body and mounting means on said support means for pivotally supporting said first chuck jaw for movement about an axis extending transverse to the longitudinal axis of said chuck body;

actuating means slidable axially within said chuck body and also slidable with respect to said support means for a limited distance;

means connecting said actuating means to said mounting means so that axial movement of said actuating means with respect to said support means effects pivotal movement of said first chuck jaw; and lost motion means between said actuating means and said support means whereby axial and pivotal movements of said first chuck jaw can be carried out in sequence.

References Cited in the file of this patent

UNITED STATES PATENTS

| | | |
|---|---|---|
| 1,421,370 | Ashworth | July 4, 1922 |
| 1,915,005 | Schmidt | June 20, 1933 |
| 2,361,763 | Goddard | Oct. 31, 1944 |
| 2,865,643 | Parker | Dec. 23, 1958 |
| 2,922,657 | Garrison | Jan. 26, 1960 |
| 3,056,609 | Buck | Oct. 2, 1962 |